(12) United States Patent
Hasunuma

(10) Patent No.: US 8,037,769 B2
(45) Date of Patent: Oct. 18, 2011

(54) PRESSURE GAUGE AND PRESSURE GAUGE ASSEMBLY

(75) Inventor: Masahiro Hasunuma, Gyoda (JP)

(73) Assignee: Surpass Industry Co., Ltd, Saitama (JP)

( * ) Notice: Subject to any disclaimer, the term of this patent is extended or adjusted under 35 U.S.C. 154(b) by 211 days.

(21) Appl. No.: 12/065,102

(22) PCT Filed: Aug. 18, 2006

(86) PCT No.: PCT/JP2006/316668
§ 371 (c)(1),
(2), (4) Date: May 18, 2009

(87) PCT Pub. No.: WO2007/026602
PCT Pub. Date: Mar. 8, 2007

(65) Prior Publication Data
US 2009/0301207 A1      Dec. 10, 2009

(30) Foreign Application Priority Data
Aug. 31, 2005  (JP) .................................. 2005-251561

(51) Int. Cl.
*G01L 7/00* (2006.01)
(52) U.S. Cl. ........................................................ 73/700
(58) Field of Classification Search .................... None
See application file for complete search history.

(56) References Cited

U.S. PATENT DOCUMENTS

| 4,552,153 A | * | 11/1985 | Newman et al. ............... 600/490 |
| 5,012,678 A | * | 5/1991 | Buchanan ........................ 73/738 |
| 5,346,775 A | * | 9/1994 | Jin et al. ......................... 428/614 |
| 5,377,539 A | * | 1/1995 | LaSalle .......................... 73/146.8 |
| 6,216,541 B1 | * | 4/2001 | Carpenter ....................... 73/741 |

FOREIGN PATENT DOCUMENTS

| JP | 44 194 | 1/1969 |
| JP | 48 045679 | 6/1973 |
| JP | 49 50972 | 5/1974 |
| JP | 53-129384 | 10/1978 |

(Continued)

OTHER PUBLICATIONS

Office Action for Related Japanese Patent Application No. 2005 251561.

(Continued)

*Primary Examiner* — Andre J Allen
(74) *Attorney, Agent, or Firm* — Millen, White, Zelano & Branigan, P.C.

(57) ABSTRACT

A pressure gauge includes a pressure measurement-display portion (11) for measuring a pressure and displaying the pressure by a pointer, a fitting portion (21) extending from the pressure measurement-display portion and having a pressure detection passage (22) formed therein, and an orifice member (60) arranged in the pressure detection passage and having an orifice (62) formed therein. This pressure gauge prevents breakage of an internal mechanism of the pressure gauge owing to a pressure change phenomenon. Incidentally, an orifice may be formed at a part of the pressure detection passage in place of the orifice member. A pressure gauge assembly (1) includes a pressure gauge (10) having a fitting portion having a pressure detection passage formed therein, and a joint (30, 40) for connecting the fitting portion of the pressure gauge to a conduit line, wherein an orifice (49) is formed at a part of an internal passage of the joint.

16 Claims, 7 Drawing Sheets

FOREIGN PATENT DOCUMENTS

| JP | 56 60893 | 5/1981 |
|---|---|---|
| JP | 56 97692 | 8/1981 |
| JP | 56-97692 A | 8/1981 |
| JP | 63 026748 | 5/1983 |
| JP | 58 51211 | 11/1983 |
| JP | 61-167832 A | 7/1986 |
| JP | 6 35938 | 2/1994 |
| JP | 6-194248 A | 7/1994 |
| JP | 8-271367 A | 10/1996 |
| JP | 2002-310823 A | 10/2002 |
| JP | 2004-12140 A | 1/2004 |

OTHER PUBLICATIONS

English Translation of Office Action for Related Japanese Patent Application No. 2005 251561.
Partial Translation of JP-56 60893, Publication Date: May 23, 1981.
English machine translation for JP-6 35938, Publication Date: Feb. 10, 1994.
English Translation of Japanese Office Action for Related Patent Application No. 2005 251561 dated Apr. 26, 2011.
Japanese Office Action for Related Patent Application No. 2005 251561 dated Apr. 26, 2011.
Partial Translation of Japanese Unexamined Utility Model Publication No. 48 045679, Publication Date: Jun. 14, 1973.
Partial Translation of Japanese Unexamined Utility Model Publication No. 44 194, Publication Date: Jan. 8, 1969.
Partial Translation of Japanese Unexamined Utility Model Publication No. 49 50972, Publication Date: May 17, 1974.
Partial Translation of Japanese Unexamined Utility Model Publication No. 56 97692, Publication Date: Aug. 6, 1981.
Partial Translation of Japanese Unexamined Utility Model Publication No. 58 51211, Publication Date: Nov. 15, 1983.
Partial Translation of Japanese Unexamined Utility Model Publication No. 63 026748, Publication Date: May 31, 1983.

* cited by examiner

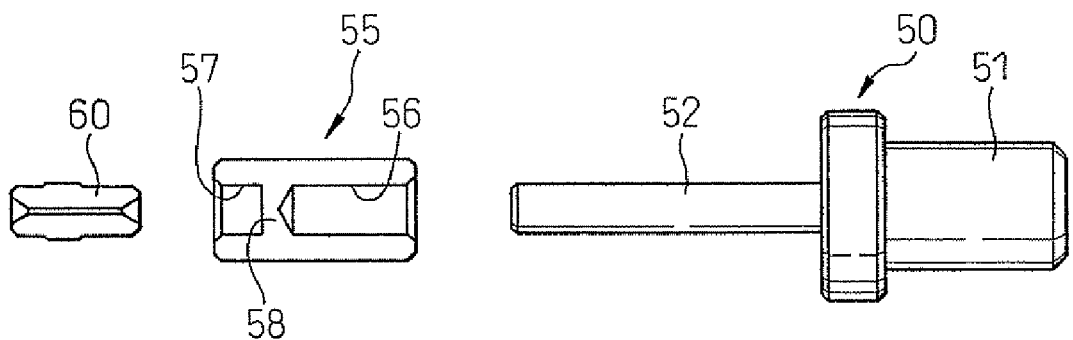
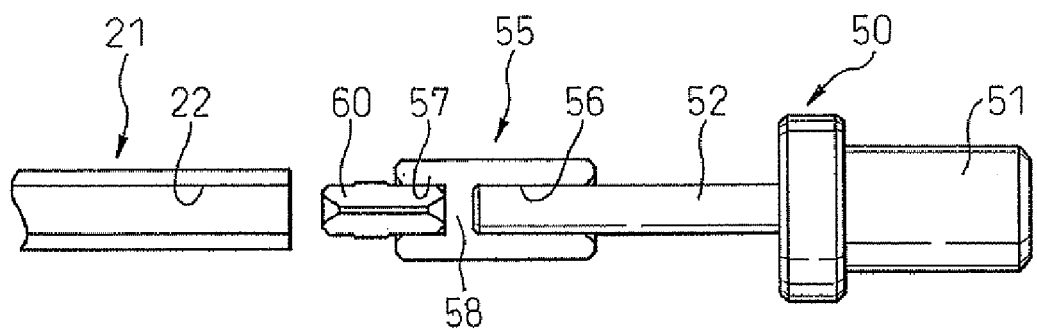
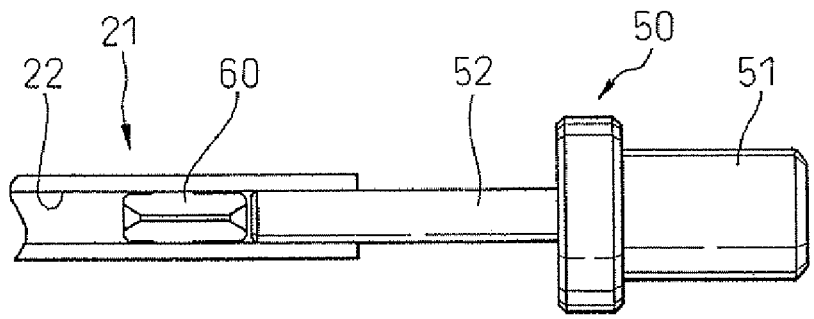

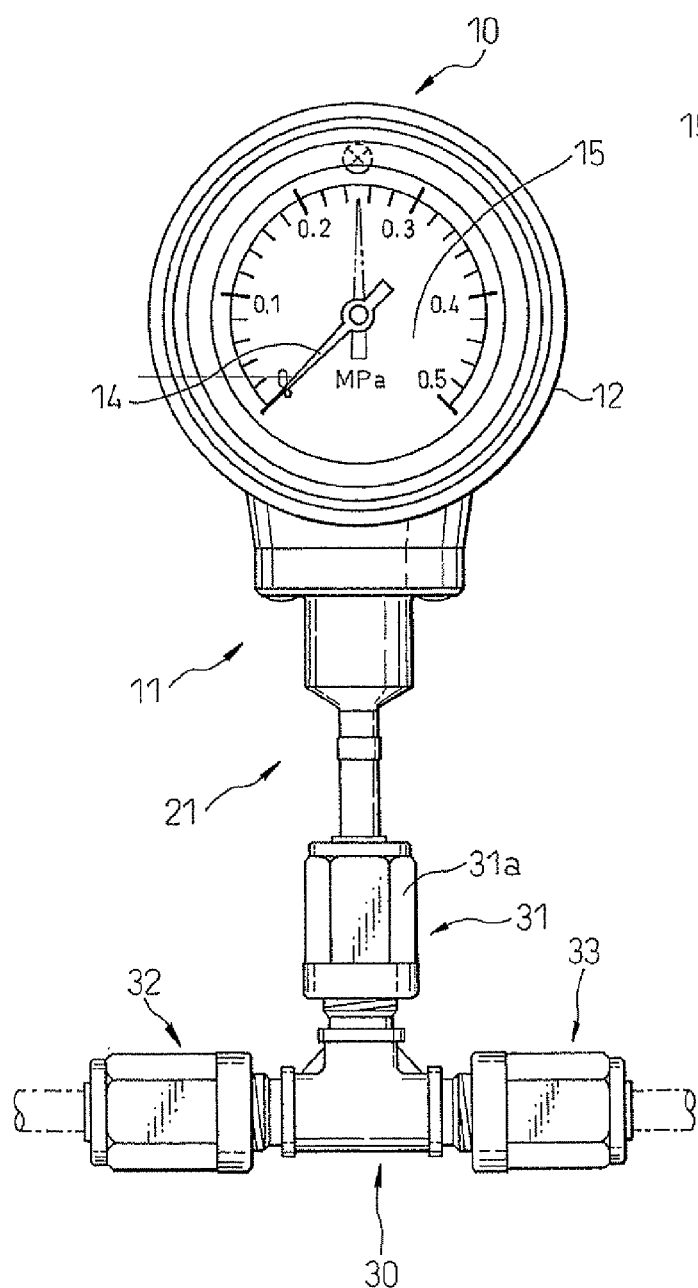
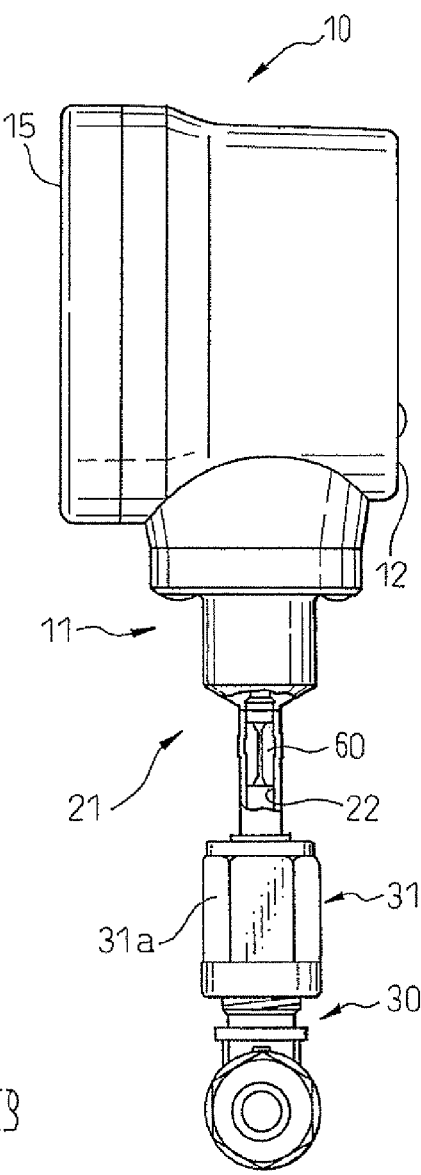

PRESSURE GAUGE AND PRESSURE GAUGE ASSEMBLY

TECHNICAL FIELD

This invention relates to a pressure gauge interposed into a conduit line, for measuring a fluid flowing inside the conduit line and a pressure gauge assembly including such a pressure gauge and a coupling connected to the pressure gauge.

BACKGROUND ART

FIG. 7a shows a pressure gauge according to the prior art disclosed in Japanese Unexamined Patent Publication (Kokai) No. 2002-310823. To measure a pressure of a fluid flowing inside a conduit line 101 as shown in FIG. 7a, a pressure gauge 102 is interposed into the conduit line 101. The pressure gauge 102 is fitted by screwing it into a fitting hole 105 of a coupling 104 to which the conduit line 101 is connected. The pressure gauge 102 detects the pressure of the fluid flowing inside a flow passage 106 formed in the coupling 104 and communicated with the conduit line 101 and displays the pressure of the fluid by a display portion 108 having a pointer 107.

FIG. 7b is a partial enlarged view of the pressure gauge shown in FIG. 7a. As shown in FIG. 7b, the pressure gauge 102 includes a fitting portion 111 having a male screw to be screwed into the fitting hole 105 of the coupling 104 and a measurement portion 112 fixed to this fitting portion 111. A pressure detection passage 111a is formed in the fitting portion 111 and the pressure of the fluid from the pressure detection passage 111a acts on a diaphragm 113. The diaphragm 113 is shaped into a bottomed cylinder shape and its peripheral surface is an expandable-contractible bellows portion 114 shaped into a bellows shape. An operation rod 115 of the measurement portion 112 is fitted into the diaphragm 113 from the upper side thereof. In other words, in the pressure gauges 102 of this kind, the contractible diaphragm 113 is disposed in such a fashion that the fluid does not directly contact the operation rod 115 of the measurement portion 112 and the pressure of the fluid is transmitted to the operation rod 115 via the diaphragm 113.

In the pressure gauge 102 disclosed in Japanese Unexamined Patent Publication (Kokai) No. 2002-310823, a protective cap 119 is disposed for covering around an end portion of the operation rod 115. The protective cap 119 is formed of a corrosion-resistant material and prevents corrosion of an internal mechanism of the pressure gauge 102 by a chemical solution when the pressure of the conduit line 101 through which the chemical solution flows is measured.

The pressure of the fluid flowing inside the conduit line 101 is transmitted from the pressure detection passage 111a of the fitting portion 111 to the diaphragm 113, and as a result, the diaphragm 113 is compressed upward by the pressure of the fluid and the operation rod 115 fitted into the diaphragm 113 is lifted up. With the movement of this operation rod 115, the pointer 107 of the display portion 108 of the measurement portion 112 is pivoted to indicate the pressure.

When a valve (not shown in the drawing) for opening and closing the conduit line is disposed in the conduit line immediately downstream from the pressure gauge, for example, the pressure drastically increases immediately before the valve if the fluid inside the conduit line 101 is abruptly stopped by the valve, and the pressure drastically drops if the valve is abruptly released, which results in what is known as a "water hammer". Even when such a water hammer occurs, the pressure gauge linearly responds in accordance with the magnitude of the water hammer and consequently, the internal mechanism portion of the pressure gauge such as the diaphragm and the operation rod may be broken owing to the force of the water hammer.

The pressure gauge disclosed in Japanese Unexamined Patent Publication (Kokai) No. 2002-310823 avoids the influences of the chemical solution by using the material having high chemical resistance as described above, but cannot prevent a water hammer from occurring. Therefore, breakage of the pressure gauge is likewise a matter of concern.

The present invention is completed in view of the circumstances described above and is directed to provide a pressure gauge capable of suppressing breakage of an internal mechanism resulting from a pressure change phenomenon inside a conduit line such as a water hammer, and a pressure gauge assembly having such a pressure gauge.

SUMMARY OF THE INVENTION

According to first aspect of the present invention for accomplishing the objects described above, there is provided a pressure gauge including a pressure measurement-display portion for measuring a pressure and displaying the pressure by a pointer; a fitting portion extending from the pressure measurement-display portion and having a pressure detection passage formed therein; and an orifice member arranged in the pressure detection passage and having an orifice formed therein.

In other words, according to the first aspect, the pressure of the conduit line connected to the pressure gauge is transmitted to the pressure measurement-display portion through the orifice. Therefore, the impact of a pressure change phenomenon such as a water hammer inside the conduit line is lessened and breakage of the internal mechanism of the pressure gauge can be suppressed. According to the first aspect, the orifice member for which relatively high accuracy is required can be produced separately and can be assembled later to the pressure gauge. An existing pressure gauge can be easily protected from the water hammer effect by fitting an orifice member to the existing pressure gauge.

According to the second aspect, there is provided a pressure gauge including a pressure measurement-display portion for measuring a pressure and displaying the pressure by a pointer; and a fitting portion extending from the pressure measurement-display portion and having a pressure detection passage formed therein; wherein an orifice is formed at a part of the pressure detection passage.

In other words, according to the second aspect, the pressure of the conduit line connected to the pressure gauge is transmitted to the pressure measurement-display portion through the orifice. Therefore, the impact resulting from the pressure change phenomenon such as the water hammer operation inside the conduit line is weakened and breakage of the internal mechanism of the pressure gauge can be suppressed. According to the second aspect, further, the orifice can be easily formed.

According to the third aspect, as in the first or second aspect, the length of the orifice parallel to the pressure detection passage is from about 10 times to about 30 times the inner diameter of the orifice.

In other words, according to the third aspect, response of the pressure gauge can be maintained while the impact resulting from the pressure change is being weakened, by using the orifice having such a size.

According to the fourth aspect, as in any of the first to third aspect, the orifice is arranged adjacent to the pressure measurement-display portion in the pressure detection passage.

In other words, according to the fourth aspect, it is possible to prevent the fluid the pressure of which is to be measured from staying between the pressure measurement-display portion and the orifice.

According to the fifth aspect, there is provided a pressure gauge assembly comprising a pressure gauge including a fitting portion having a pressure detection passage formed therein; a coupling for connecting the fitting portion of the pressure gauge to a conduit line; and an orifice member arranged in an internal passage of the coupling and having an orifice formed therein.

In other words, according to the fifth aspect, the pressure of the conduit line is transmitted to the pressure gauge through the orifice of the coupling. Therefore, the impact resulting from the pressure change phenomenon such as the water hammer operation inside the conduit line is weakened and breakage of the internal mechanism of the pressure gauge can be suppressed. According to the fifth aspect, further, the orifice member for which relatively high accuracy is required can be produced separately and can be later assembled to the coupling.

According to the sixth aspect, there is provided a pressure gauge assembly comprising a pressure gauge including a fitting portion having a pressure detection passage formed therein; and a coupling for connecting the fitting portion of the pressure gauge to a conduit line; wherein an orifice is formed at a part of an internal passage of the coupling.

In other words, according to the sixth aspect, the pressure of the conduit line is transmitted to the pressure gauge through the coupling and the orifice. Therefore, the impact resulting from the pressure change phenomenon such as the water hammer operation inside the conduit line is weakened and breakage of the internal mechanism of the pressure gauge can be suppressed. According to the fifth aspect, further, the orifice can be easily formed.

According to the seventh aspect, as in the fifth or sixth aspect, the length of the orifice parallel to the internal passage of the coupling is from about 10 times to about 30 times the inner diameter of the orifice.

In other words, according to the seventh aspect, response of the pressure gauge can be maintained while the impact resulting from the pressure change is being weakened, by using the orifice having such a size.

According to the eighth aspect, as in any of the fifth to seventh aspect, the orifice is arranged adjacent to the fitting portion of the pressure gauge in the internal passage of the coupling.

In other words, according to the eighth aspect, it is possible to prevent the fluid the pressure of which is to be measured from staying between the pressure measurement-display portion and the orifice.

These objects, features and advantages of the present invention and other objects, features and advantages will become more apparent from the detailed explanation of typical embodiments of the present invention illustrated in the accompanying drawings.

BRIEF DESCRIPTION OF THE DRAWINGS

FIG. 3a is a first view for explaining the insertion of the orifice member into a fitting portion of the pressure gauge.

FIG. 3b is a second view for explaining the insertion of the orifice member into the fitting portion of the pressure gauge.

FIG. 3c is a third view for explaining the insertion of the orifice member into the fitting portion of the pressure gauge.

FIG. 4a is a front view of an example that uses the pressure gauge of the present invention.

FIG. 4b is a side view of the example that uses the pressure gauge of the present invention.

FIG. 7b is a partial enlarged view of the pressure gauge shown in FIG. 7a.

BEST MODE FOR CARRYING OUT THE INVENTION

Figure 1A:
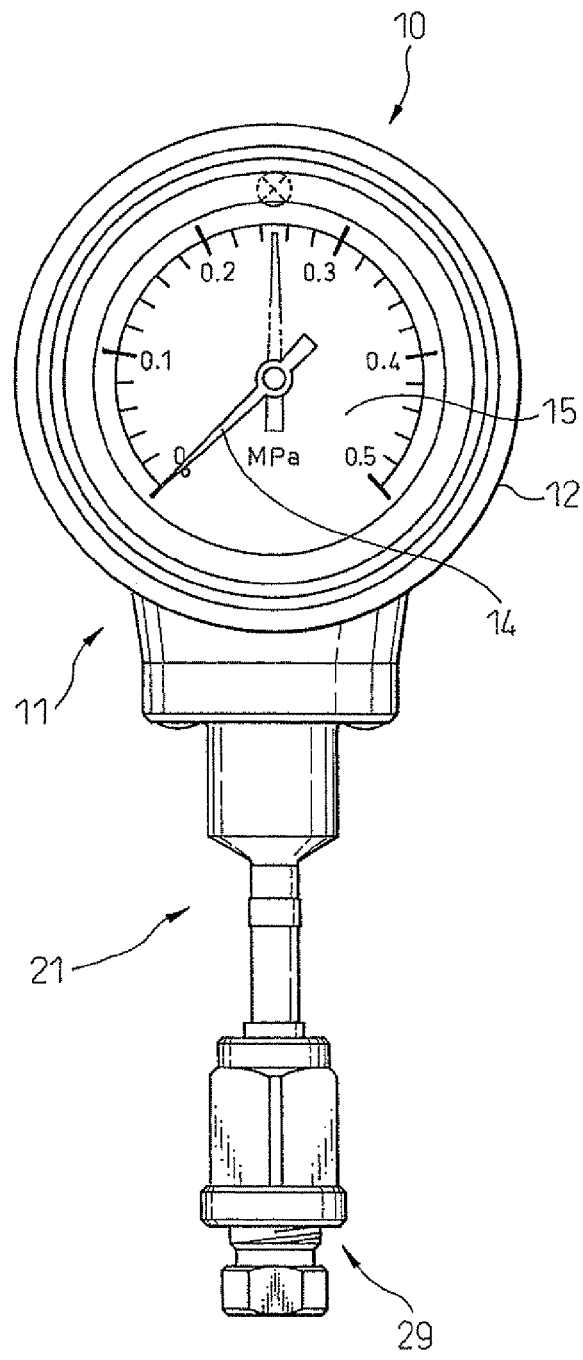
FIG. 1a is a front view of a pressure gauge according to the first embodiment of the present invention.

The best mode for carrying out the invention will be hereinafter explained with reference to the accompanying drawings. In the following drawings, the same or similar reference numeral will be assigned to the same or similar member. In order for the invention to be more easily understood, the scale of the drawings has been appropriately reduced.

Figure 1B:
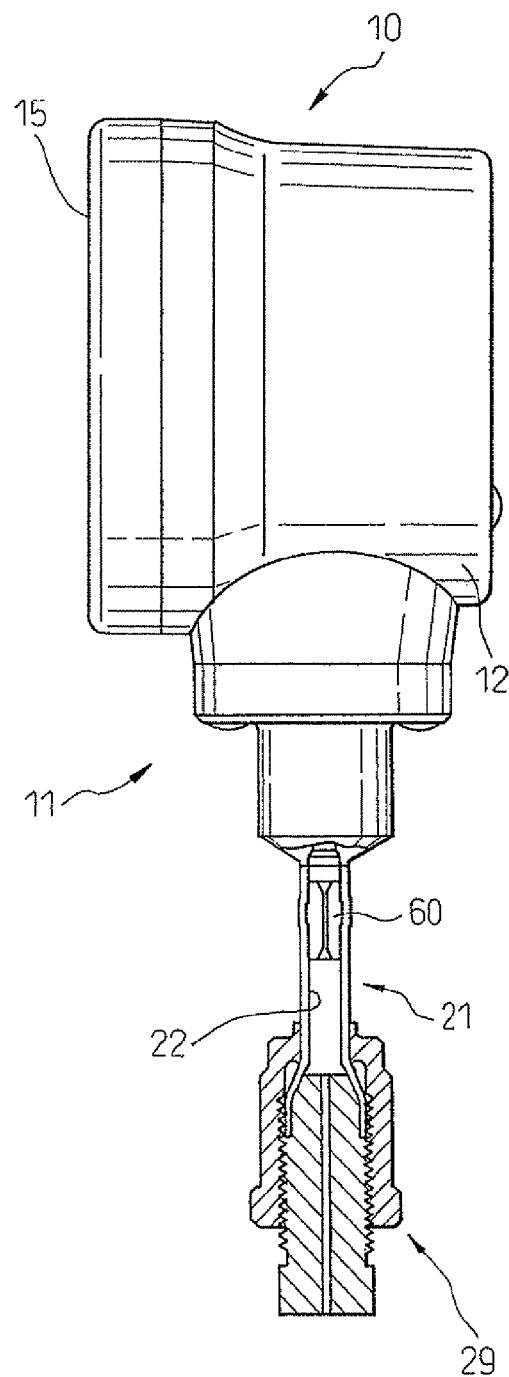
FIG. 1b is a side view according to the first embodiment of the present invention.

FIG. 1a and FIG. 1b are a front view and a side view of a pressure gauge according to the first embodiment of the present invention, respectively. As shown in these drawings, the pressure gauge 10 includes a pressure measurement-display portion 11 for measuring a pressure and displaying the pressure so measured and a fitting portion 21 which extends from the pressure measurement-display portion 11 and in which a pressure detection passage 22 is formed. The fitting portion 21 which is formed of a fluoroplastics material is either connected directly to a conduit line (not shown in the drawings) through which a fluid flows or to a coupling 30, which is described later. In FIGS. 1a and 1b, a protective cap 29 to be fitted at the time of shipment of a product is arranged to the distal end of the fitting portion 21.

The pressure measurement-display portion 11 includes an internal mechanism portion 13 (not shown in the drawings) arranged in a lower part of a housing 12. Since this internal mechanism portion 13 is of a known type, its explanation will be omitted. When the pressure gauge 10 is fitted to a conduit line not shown in the drawings, the pressure of the fluid inside the conduit line is transmitted to the internal mechanism portion 13 through the pressure detection passage 22 of the fitting portion 21. The value of the pressure is measured in the internal mechanism portion 13. Then, an indicating pointer 14 of the display portion 15 arranged on the front surface of the pressure measurement-display portion 11 pivots in accordance with the pressure value.

Figure 2:
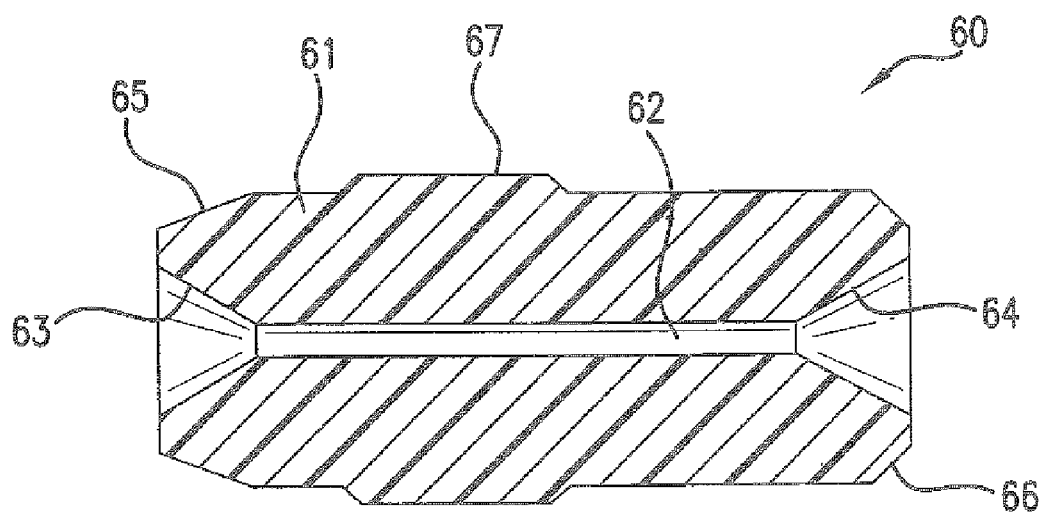
FIG. 2 is a sectional side view of an orifice member.

As shown in FIG. 1b, in the pressure gauge 10 according to the present invention, an orifice member 60 is fitted into the pressure detection passage 22 and extends longitudinally therein. FIG. 2 is a sectional side view of the orifice member 60. The orifice member 60 substantially has a cylindrical shape having an outer diameter that is a slightly smaller than an inner diameter of the pressure detection passage 22. An orifice 62 is formed as a through-hole defining a tubular bore extending in a longitudinal direction inside the orifice member 60 as shown in the drawings. An inner diameter of tubular bore defining this orifice 62 is by far smaller than the outer diameter of the orifice member 60. The length of the orifice 62 is within the range of about 10 to about 30 times the inner diameter of the orifice 62.

The orifice member 60 is preferably formed of a fluoroplastic material so that corrosion of the orifice member 60 by a chemical solution can be suppressed when the pressure of the chemical solution having high corrosiveness is measured. Further preferably, the orifice member 60 is formed of a fluoroplastic material having a higher strength than the fluoroplastic material forming the fitting portion 21 as will be described later.

Taper portions 63 and 64 connected by a connecting portion 62*a* of the bore forming the orifice 62 are formed at the front and rear open ends of the orifice 62 in such a fashion that the diameter becomes progressively greater or expands towards the outside. These taper portions 63 and 64 have a frustroconical configuration to help the fluid to easily flow into and out from the orifice 62. A ring-like projection portion 67 is disposed on the peripheral surface of the orifice member 60. An outer diameter of the ring-like projection portion 67 is substantially equal to or a slightly greater than the inner diameter of the pressure detection passage 22. The ring-like projection portion 67 is formed on the front side of the center of the orifice member 60, i.e., on the side of the taper portion 63. Furthermore, chamfer portions 65 and 66 that facilitate the insertion of the orifice member 60 are formed on the front and rear surfaces of the orifice member 60 as shown in the drawing, respectively.

FIGS. 3*a* to 3*c* are views for explaining the insertion of the orifice member into the fitting portion of the pressure gauge. A first jig 50 and a second jig 55 are used to fit the orifice member 60 into the pressure detection passage 22 of the fitting portion 21. As shown in FIG. 3*a*, the first jig 50 has a handle 51 and a rod 52 extending from the handle 51. An outer diameter of the rod 52 is a slightly smaller than the inner diameter of the pressure detection passage 22. Recess portions 56 and 57 are formed coaxially with each other on both end faces of the second jig 55 that is a substantial cylindrical member. The inner diameters of these recess portions 56 and 57 are substantially equal to the inner diameter of the pressure detection passage 22. Furthermore, a stopper 58 is interposed between these recess portions 56 and 57 as shown in the drawings.

As shown in FIG. 3*b*, an operator grips the handle 51 of the first jig 50 and inserts the rod 52 into the recess portion 56 of the second jig 55 until it strikes the stopper 58. Then, the orifice member 60 is fitted into the recess portion 57 of the second jig 55 from rear side of the orifice member 60. The recess portion 57 is formed into the depth sufficient enough to accommodate the orifice member 60 from its ring-like projection portion 67 to its rear end face. Since the ring-like projection portion 67 is disposed on the front side with respect to the center of the orifice member 60, the orifice member 60 does not easily come off when it is supported by the second jig 55.

The handle 51 is pushed to under this state thereby fit the orifice member 60 into the pressure detection passage 22. The first jig 50 and the second jig 55 are pulled out while the orifice member 60 is left at the entrance of the pressure detection passage 22, and are then separated from one another. Then, as shown in FIG. 3*c*, the rod 52 of the first jig 50 is pushed into the pressure detection passage 22 to fit the orifice member 60 into a desired position inside the pressure detection passage 22.

As can be seen from FIG. 1*b*, it is preferable to arrange the orifice member 60 immediately below the pressure measurement-display portion 11. In other words, the orifice member 60 is preferably arranged adjacent to the pressure measurement-display portion. This arrangement makes it possible to avoid the problem that the chemical solution passing through the orifice 62 of the orifice member 60 stays between the pressure measurement-display portion 11 and the orifice member 60 due to the water hammer operation during the use of the pressure gauge 10.

After the orifice member 60 is inserted to the desired position inside the pressure detection passage 22, the rod 52 is pulled out and the orifice member 60 is thermally fused into the pressure detection passage 22 by applying heat and pressure from outside the fitting portion 21, and as a result, the pressure detection passage 22 undergoes shrinkage toward the inside in the radial direction and the orifice member 60 is fixed under the sealed state inside the pressure detection passage 22. Therefore, clearance is eliminated between the orifice member 60 and the inner surface of the pressure detection passage 22 and the pressure from the conduit line (not shown in the drawings) is transmitted to the internal mechanism portion 13 through only the orifice 62 of the orifice member 60. As a matter of course, the orifice member 60 may well be fitted to the pressure detection passage 22 by a method different from the method that uses the jigs 50 and 55.

The orifice member 60 preferably has strength and heat resistance sufficient to withstand deformation at the time of thermal fusing and preferably has higher strength and higher heat resistance than the material of the fitting portion 21, in particular. Under this condition, it becomes possible to prevent the size of the orifice 62 of the orifice member 60 from changing at the time of thermal fusing. An example of the preferred material of the orifice member 60 is PCTFE (polychlorotrifluoroethylene) and an example of the preferred material of the fitting portion 21 is PFA (perfluoroalkoxyethylene).

FIGS. 4*a* and 4*b* are a front view and a side view in an example that uses the pressure gauge 10 based on the present invention, respectively. In this example, the fitting portion 21 of the pressure gauge 10 is connected to one joint portion 31 of a T-shaped coupling 30 and is fixed by a cap 31*a* with a screw. In this case, the pressure gauge 10 measures the pressure of the fluid flowing between other joint portions 32 and 33 that are aligned in a line. Incidentally, the pressure gauge 10 may be directly fitted to the conduit line (not shown) without using the T-shaped coupling 30 although the arrangement is not shown in the drawings.

When such a pressure gauge 10 is used, the pressure flowing through the conduit line is transmitted to the internal mechanism portion 13 of the pressure measurement-display portion 11 through the orifice 62 of the orifice member 60. Therefore, the impact resulting from the pressure change such as the water hammer operation is weakened when the fluid passes through the orifice 62. Consequently, the internal mechanism portion 13 is prevented from being broken in the present invention. Incidentally, the effective sectional area of the passage through which the pressure passes decreases at the time of the passage through the orifice 62 but the pressure itself does not change. Therefore, the suitable pressure value can be measured and displayed in the pressure measurement-display portion 11 of the pressure gauge 10.

Because the orifice member 60 is disposed, in response the pressure measurement-display portion 11 slightly drops, but the drop does not result in the problem when the length of the orifice 62 is within the range of about 10 to about 30 times the inner diameter of the orifice 62. In other words, when the dimension of the orifice 62 is set to the range described above, the response of the pressure gauge 10 can be maintained while the impact resulting from the pressure change phenomenon is weakened.

Production of the orifice member 60 having the orifice 62 formed therein requires relatively high accuracy. In this embodiment, the orifice member 60 is produced separately from the pressure gauge 10. Therefore, the yield of the fitting portion 21 does not drop in this embodiment.

Furthermore, the orifice member 60 may be fitted as a post-fitting member to a pressure detection passage of an existing pressure gauge. In other words, when the orifice member 60 according to the present invention is assembled to an existing pressure gauge, the existing pressure gauge can be easily protected from the pressure change phenomenon such as the water hammer operation.

Figure 5A:
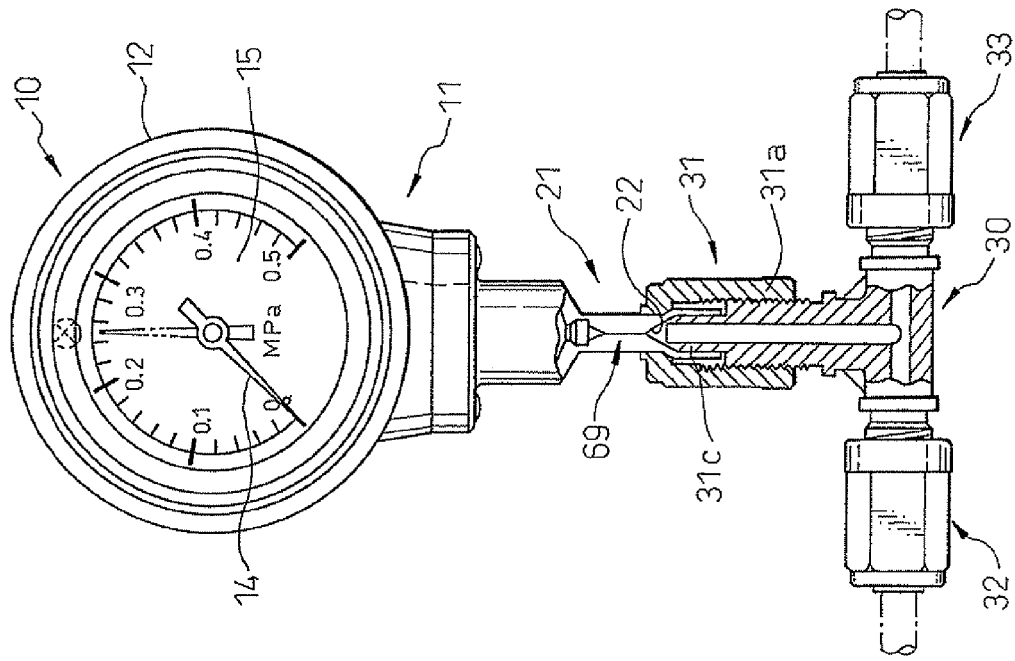
FIG. 5a is a front view of a pressure gauge according to the second embodiment of the present invention.

FIG. 5a is a front view of a pressure gauge according to the second embodiment of the present invention. In FIG. 5a, a pressure gauge 10 is connected to a T-shaped coupling 30 and a joint portion distal end 31c of a joint portion 31 is engaged with a distal end of a fitting portion 21. A cap 31a with a screw meshes the fitting portion 21 with the joint portion distal end 31c.

As shown in the drawing, the inner surface of the pressure detection passage 22 of the fitting portion 21 is curved partially towards the inside in the second embodiment to thereby form an orifice 69. The orifice 69 has substantially the same size as the orifice 62 of the orifice member 60 described above. Preferably, this orifice 69 is formed simultaneously when the fitting portion 21 is molded and in this way, the orifice 69 can be easily formed. In such a case, the pressure of a conduit line (not shown in the drawing) is transmitted to an internal mechanism portion 13 (not shown) through the T-shaped coupling 30 and the orifice 69, and as a result, substantially the same effects as those described above can be acquired.

In the second embodiment, since the orifice 69 is formed by the inner surface of the pressure detection passage 22, the process step of inserting the orifice member 60 into the pressure detection passage 22 and the process step of thermally fusing them together can be eliminated. As a result, the production time can be shortened. In the first embodiment described above, there is the case where the orifice member 60 is not satisfactorily heat-fused to the pressure detection passage 22, but such a defect resulting from the effect of thermal fusing can be avoided in the second embodiment that does not require the thermal fusing step.

Figure 5B:
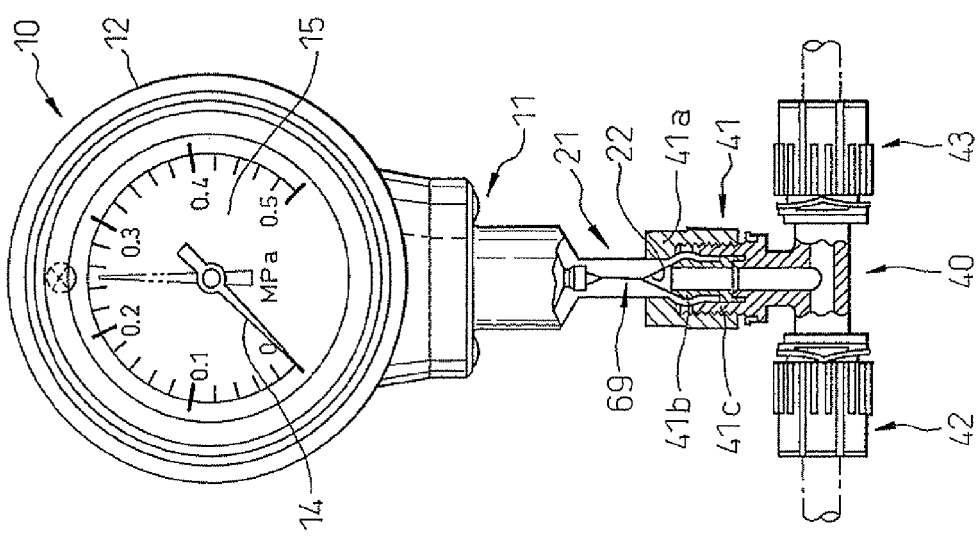
FIG. 5b is a front view of another pressure gauge according to the second embodiment of the present invention.

FIG. 5b is a front view of another pressure gauge according to the second embodiment of the present invention. The orifice 69 is formed in the pressure detection passage 22 of the pressure gauge 10 in the same way as in the case of FIG. 5a. This pressure gauge 10 is connected to a T-shaped coupling 40 having a different construction from that of the T-shaped coupling 30. More concretely, an insertion piece 41b in which a through-passage is formed, is inserted into and held by an entrance of the pressure detection passage 22 and then the pressure detection passage 22 having the insertion piece 41b is inserted into the joint portion distal end 41c. As can be seen from FIG. 5b, an internal flow passage of the joint portion distal end 41c and the through-passage of the insertion piece 41b are coaxial with each other and their inner diameters are substantially equal to each other. After that a cap 41a with a screw meshes the fitting portion 21 with the joint portion distal end 41c. Obviously, this construction can obtain the effects similar to those described above.

Figure 6A:
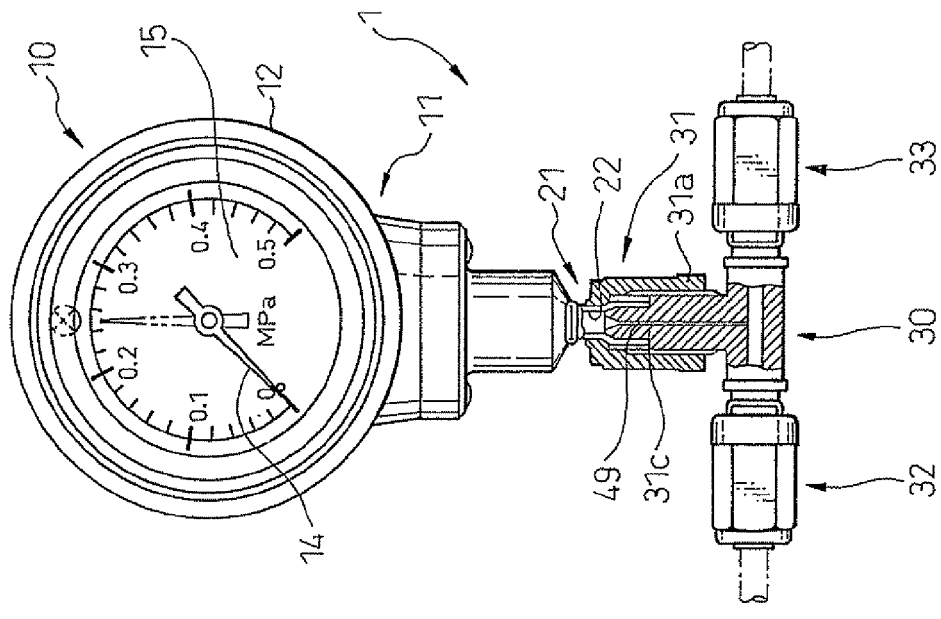
FIG. 6a is a front view of a pressure gauge assembly according to the present invention.

FIG. 6a is a front view of a pressure gauge assembly according to the present invention. The pressure gauge assembly 1 shown in FIG. 6a mainly includes a pressure gauge 10 having a fitting portion 21 and a T-shaped coupling 30 connected to the fitting portion 21 of the pressure gauge 10. This pressure gauge 10 is different from the pressure gauge described above in that the orifices 62 and 69 are not formed in the pressure detection passage 22 of the pressure gauge 10 shown in FIG. 6a. The T-shaped coupling 30 has substantially the same construction as that of the T-shaped coupling 30 shown in FIG. 5a.

In the pressure gauge assembly 1 shown in FIG. 6a, an orifice 49 is formed at the joint portion distal end 31c of the joint portion 31 of the T-shaped coupling 30. This orifice 49 has an inner diameter substantially equal to that of the orifice 62 described above and is formed throughout the entire part of the joint portion 31. Because the orifice 49 can be formed simultaneously with the production of the T-shaped coupling 30, the orifice 49 can be formed easily. Under the state where the pressure gauge 10 is connected to the T-shaped coupling 30 as shown in the drawing, the orifice 49 is positioned at a position relatively close to a pressure measurement-display portion 11.

In such a case, the pressure flowing through a conduit line (not shown in the drawing) is transmitted to the internal mechanism portion 13 of the pressure measurement-display portion 11 through the T-shaped coupling 30 and the orifice 49. Therefore, the impact resulting from the pressure change such as the water hammer operation is weakened at the time of the passage through the orifice 62 and the breakage of the internal mechanism portion 13 can be suppressed. Though the effective sectional area drops at the time of the orifice 49 as described above, the pressure itself does not change and an appropriate pressure value can be measured and displayed in the pressure measurement-display portion 11 of the pressure gauge 10.

Figure 6B:
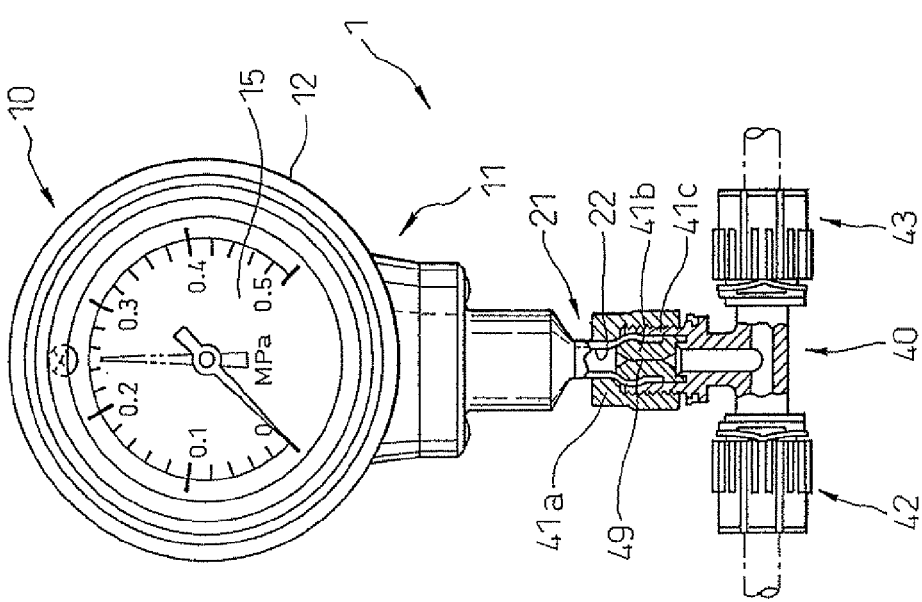
FIG. 6b is a front view of another pressure gauge assembly according to the present invention.
Figure 7A:
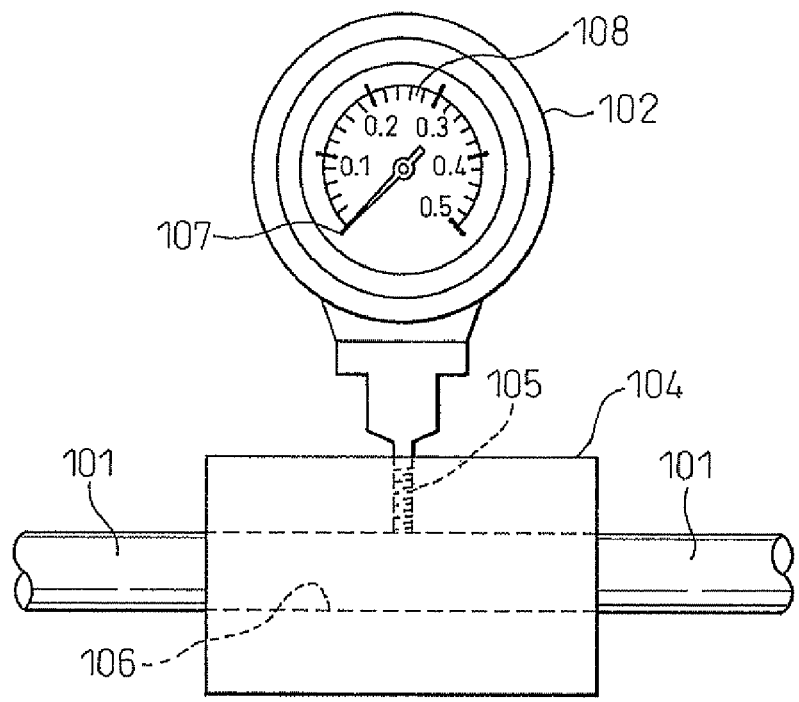
FIG. 7a is a view showing a pressure gauge of the prior art.
Figure 7B:
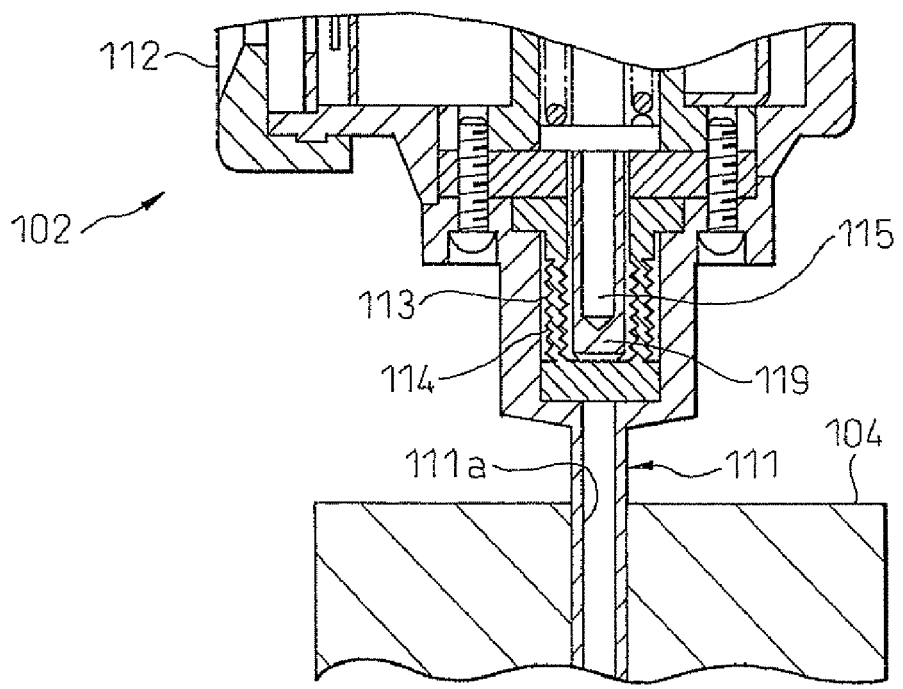

FIG. 6b is a front view of another pressure gauge assembly according to the present invention. The pressure gauge assembly 1 shown in FIG. 6b mainly includes a pressure gauge 10 having a fitting portion 21 and a T-shape coupling 40 connected to the fitting portion 21 of the pressure gauge 10. The T-shaped coupling 40 has a construction substantially similar to that of the T-shaped coupling 40 shown in FIG. 5b.

In the pressure gauge assembly 1 shown in FIG. 6b, an orifice 49 is formed in an insertion piece 41b of a joint portion 41 of the T-shaped coupling 40. It is further assumed that the orifice 49 is formed simultaneously with the production of the insertion piece 41b. Under the state where the pressure gauge 10 is connected to the T-shaped coupling 40 as shown in the drawing, the orifice 49 is positioned at a position relatively close to a pressure measurement-display portion 11. It would be obvious that the pressure gauge assembly 1 shown in FIG. 6b can acquire effects similar to those described above.

The present invention includes within its scope an appropriate combination of the features of the pressure gauge with the features of the pressure gauge assembly based on the embodiments described above. Therefore, the pressure gauge assembly including the pressure gauge 10 and the T-shaped coupling 30 connected to this pressure gauge, such as the one shown in FIGS. 4a and 4b, is embraced within the scope of the present invention.

A pressure gauge assembly, not shown in the drawings, in which an orifice member 60 having a shape corresponding to the joint portion distal end 31c is fitted and fixed into the joint portion distal end 31c of the joint portion 31, for example, is also included within the scope of the present invention. In this case, it would be obvious to those skilled in the art that this pressure gauge can be similarly protected from the pressure change phenomenon by inserting the orifice member 60 into an existing joint connected to the pressure gauge.

Furthermore, the present invention is not limited by the type of the pressure gauge. Namely, all types of pressure gauges such as a bellows type pressure gauge are included within the scope of the present invention as long as they have the constructions equipped with the afore-mentioned orifice.

Although the present invention has thus been explained with reference to typical embodiments thereof, it would be obvious for those skilled in the art that the changes described above and other changes and modification, and omission and addition could be made to the present invention without departing from the scope of the invention.

DESCRIPTION OF REFERENCE NUMERALS

1: pressure gauge assembly
10: pressure gauge
11: pressure measurement-display portion
12: housing
13: internal mechanism portion
14: pointer
15: display portion
21: fitting portion
22: pressure detection passage
29: protective cap
30: T-shaped coupling
31: joint portion
31a: cap with screw
31c: joint portion distal end
32, 33: joint portion
40: T-shaped coupling
41a: cap with screw
41b: insertion piece
41c: joint portion distal end
60: orifice member
62, 69, 49: orifice
63, 64: taper portion
65, 66: chamfer portion
67: ring-like projection portion

The invention claimed is:

1. A pressure gauge comprising:
a pressure measurement-display portion for measuring a pressure and displaying the pressure by a pointer;
a fitting portion extending from said pressure measurement-display portion and having a pressure detection passage formed therein; and
an orifice member arranged extending longitudinally in said pressure detection passage and having a longitudinal orifice extending therein; wherein the orifice member has a cylindrical shape having an outer diameter that is a slightly smaller than an inner diameter of the pressure detection passage, and wherein the orifice is formed as a through-hole extending in a longitudinal direction inside the orifice member.

2. A pressure gauge according to claim 1, wherein the length of said orifice parallel to said pressure detection passage is from about 10 times to about 30 times the inner diameter of said orifice.

3. A pressure gauge according to claim 1, wherein said orifice is arranged adjacent to said pressure measurement-display portion in said pressure detection passage.

4. A pressure gauge according to claim 1, wherein taper portions of an expanding diameter are formed at front and rear ends of the orifice.

5. A pressure gauge according to claim 1, wherein the through-hole is a bore extending longitudinally through the orifice member, the bore having a front end opening toward the pressure measurement-display portion and a rear end opening away from the pressure measurement-display portion, the front end and rear ends of the bore being connected by a connecting portion having an inner diameter substantially less than the outer diameter of the orifice member.

6. A pressure gauge according to claim 5, wherein the front and rear ends of the bore each expand in diameter with respect to diameter of the connecting portion of the bore.

7. A pressure gauge according to claim 6, wherein the front and rear end openings are frustoconical.

8. The pressure gauge according to claim 1, wherein the orifice member is made of fluoroplastic material.

9. A pressure gauge assembly comprising:
a pressure gauge including a fitting portion having a pressure detection passage formed therein;
a coupling for connecting said fitting portion of said pressure gauge to a conduit line; and
an orifice member arranged in and extending longitudinally in an internal passage of said coupling and having a longitudinal orifice extending therein; wherein the orifice member has a cylindrical shape having an outer diameter that is a slightly smaller than an inner diameter of the pressure detection passage, and the orifice is formed as a through-hole extending in a longitudinal direction inside the orifice member.

10. A pressure gauge assembly according to claim 9, wherein the length of said orifice parallel to said internal passage of said coupling is from about 10 times to about 30 times the inner diameter of said orifice.

11. A pressure gauge assembly according to claim 9, wherein said orifice is arranged adjacent to said fitting portion of said pressure gauge in said internal passage of said coupling.

12. A pressure gauge according to claim 9, wherein taper portions of an expanding diameter are formed at front and rear ends of the orifice.

13. A pressure gauge according to claim 9, wherein the through-hole is a bore extending longitudinally through the orifice member, the bore having a front end opening toward the pressure measurement-display portion and a rear end opening away from the pressure measurement-display portion, the front end and rear ends of the bore being connected by a connecting portion having an inner diameter substantially less than the outer diameter of the orifice member.

14. A pressure gauge according to claim 13, wherein the front and rear ends of the bore each expand in diameter with respect to diameter of the connecting portion of the bore.

15. A pressure gauge according to claim 14, wherein the front and rear end openings are frustoconical.

16. The pressure gauge according to claim 9, wherein the orifice member is made of fluoroplastic material.

* * * * *